United States Patent [19]
Liu

[11] Patent Number: 5,846,456
[45] Date of Patent: Dec. 8, 1998

[54] METHOD OF MAKING GRADIENT INDEX OPTICAL ELEMENT

[75] Inventor: Jui Hsiang Liu, Tainan, Taiwan

[73] Assignee: National Science Council, Taipei, Taiwan

[21] Appl. No.: 587,924

[22] Filed: Jan. 17, 1996

[51] Int. Cl.$^6$ .................................................. B29D 11/00
[52] U.S. Cl. ........................... 264/1.6; 264/1.24; 264/1.7; 264/1.38; 264/2.6
[58] Field of Search .................................. 264/1.1, 1.24, 264/1.7, 2.6, 1.27, 1.6, 1.38

[56] References Cited

U.S. PATENT DOCUMENTS

| | | | |
|---|---|---|---|
| 5,405,556 | 4/1995 | Liu | 264/1.7 |
| 5,541,247 | 7/1996 | Koike | 264/1.24 |
| 5,593,621 | 1/1997 | Koike et al. | |

FOREIGN PATENT DOCUMENTS

| | | | |
|---|---|---|---|
| 496893 | 8/1992 | European Pat. Off. | 264/1.1 |
| WO87/01071 | 2/1987 | WIPO | 264/1.27 |

OTHER PUBLICATIONS

Y. Ohtsuka and I. Nakamoto, "Light–focusing plastic rod prepared by photocopolymerization of methacrylic esters with vinyl benzoates", Applied Physics Letters, vol. 29, No. 9, 1976.

Y. Ohtsuka and Y. Hatanaka, "Preparation of light–focusing plastic fiber by heatingdrawing Process", Applied Physics Letters, vol. 29, No. 11, 1976.

Y. Ohtsuka, Y. Koike, and H. Yamazaki, "Studies on the light–focusing plastic rod. 6: The photocopolymer rod of methyl methacrylate with vinyl benzoate", Applied Optics, vol. 20, No. 2, 1981.

Y. Ohtsuka, Y. Koike, and H. Yamazaki, "Studies on the light–focusing plastic rod. 10: A light–focusing plastic fiber of methyl methacrylate–vinyl benzoate copolymer", Applied Optics, vol. 20, No. 15, 1981.

Y. Koike, Y. Kimoto, and Y. Ohtsuka, "Studies on the light–focusing plastic rod. 12: The GRIN fiber lens of methyl methacrylate–vinyl phenylacetate copolymer", Applied Optics, vol. 21, No. 6, 1982.

Y. Koike, H. Hatanaka, and Y. Ohtsuka, "Studies on the light–focusing plastic rod. 17: Plastic GRIN rod lens prepared by photocopolymerization of a ternary monomer system", Applied Optics, vol. 23, No. 11, 1984.

Y. Ohtsuka and Y. Koike, "Studies on the light–focusing plastic rod. 18: Control of refractive–index distribution of Plastic radial gradient–index rod by photocopolymerization", Applied Optics, vol. 24, No. 24, 1985.

Y. Koike, Y. Kimoto, and Y. Ohtsuka, "Studies on the light–focusing plastic rod. XIII: Photocopolymerization of methyl methacrylate–vinyl esters of aromatic carboxylic acid", J. Applied polymer Science, vol. 27, 1982.

*Primary Examiner*—Mathieu D. Vargot
*Attorney, Agent, or Firm*—Christie, Parker & Hale, LLP

[57] ABSTRACT

A method of making a gradient index optical element includes a step in which a comonomer mixture is prepared. The comonomer mixture is then injected into a preformed forming body. The forming body containing therein the comonomer mixture is subsequently processed at a constant temperature to cause the forming body to swell. Finally, the comonomer mixture contained in the swelled forming body is polymerized.

31 Claims, 18 Drawing Sheets

METHOD OF MAKING GRADIENT INDEX OPTICAL ELEMENT

FIELD OF THE INVENTION

The present invention relates generally to a method of making an optical element, and more particularly to a method of making a gradient index optical element.

BACKGROUND OF THE INVENTION

With the advent of the ruby laser which was invented in 1960, a modern optical communication system was made available to the public, as illustrated in FIG. 1. The transmission of optical signals in the optical communication system is attained by the optical fibers serving as the transmission media. Generally speaking, the optical fibers are classified on the basis of the factors, such as the nature of the material of which they are made, the profile by which the refractive index of the optical fiber is distributed, and the way by which the optical energy is transmitted. Accordingly, there are a variety of optical fibers, such as quartz optical fiber, plastic optical fiber, step index optical fiber, gradient index (or graded index) optical fiber, single-mode optical fiber and multi-mode optical fiber. The plastic optical fiber has a relatively larger diameter measured in millimeters and is therefore a multi-mode optical fiber capable of transmitting a plurality of optical signals simultaneously. On the other hand, the quartz optical fiber has a relatively small diameter, which may be so small as to be measured in microns, and is therefore either a single-mode or multi-mode optical fiber.

As compared with the inorganic quartz, an organic plastic material is by nature capable of absorbing more energy of light, especially infrared or rays of the visible spectrum. There are a number of organic materials which have a good transparency and can be used to design flexibly the parameter of the optical fiber. The case in point is a short light focusing rod of a plastic material.

The light focusing rod (abbreviated as LFR) is a gradient index optical element and is therefore called GRIN rod for short. The GRIN rod has a refractive index distribution, which takes place in a parabolic manner so that the refractive index is greatest at the central axis of the rod and so that the refractive index is progressively reduced from the central axis toward the periphery of the rod. As a result, the penetrating light is caused to move inside the rod in a zigzag manner. In the meantime, a focus phenomenon characteristic of a lens is brought about in a space located behind the light emitting end.

The GI (gradient index) optical fiber, the GRIN rod and the Wood lens are cylindrical in shape and are characteristic of such a special distribution as described above. They are similar in transmission principle to one another even though they differ from one another in length. Among three optical elements mentioned above, the GI optical fiber is greatest in length and may have a length of one hundred meters or more. The GI optical fiber is therefore suitable for use as a transmitting medium of an optical communication system, as illustrated in FIG. 1. The GRIN rod has a length intermediate between those of the GI optical fiber and the Wood lens. In other words, the GRIN rod has a length greater than a diameter thereof and is generally not used as an optical fiber. The GRIN rod is generally intended for use in transmitting an image, connecting two optical fibers or serving as a component part of the sensor. The Wood lens is a thin device having a length smaller than a diameter thereof. The Wood lens is used mainly in transmitting an image or focusing the light.

The development of the plastic GRIN rod is intended to make the commercialized products of the GI plastic optical fiber and the GI lens. As far as the inorganic GRID rod is concerned, the CVD method may be employed to make the optical fiber as well as the GRID rod. In addition, the GRID rod may be produced by the osmotic method of the molten salts or the ionic exchange method of the molten salts. The plastic optical fiber is not intended for use in long-range communication; nevertheless, it is rather suitable for use in the short-distance data communication system having a plurality of adapters, such as a local area network (LAN). The plastic optical fiber can be made at a relatively low cost and used in various applications in view of the fact that the plastic optical fiber has an excellent flexibility and a relatively greater diameter and that the plastic optical fiber can be easily finished for an on-site application and further that the plastic optical fiber gives an added flexibility in the design of an optical transmission system.

The GRIN image transmission is similar in nature to the so-called mirage, which is caused by the refraction of light rays from a distant object through various air layers having different densities as a result of unequal temperature distributions. The theory of the GRIN image transmission was first introduced in 1854 by Maxwell in his mathematical formula for GRIN optics-Maxwell Fisheye lens. The glass GRIN rod was first made successfully in 1985 by O. Schott, who employed a manufacturing process in which various cooling rates were applied. In 1905, a thin light-focusing gelatin GRIN rod was first produced by R. W. Wood.

Most of the available research reports or patents on the methods of making optical fibers are related to quartz. On the other hand, the research reports or patents on the methods of making the plastic GI rod are relatively difficult to come by. There are methods of making various GI optical elements, such as the swelling osmotic method, the optical copolymerization, the two step liquid phase osmotic copolymerization, the two-step gas phase osmotic copolymerization, the interface plastic copolymerization, the centrifugal casting, the vapor galvanizing copolymerization, etc. However, the most commonly used methods of making the GI optical elements include the gas-liquid phase osmotic method and the ultraviolet (UV) copolymerization. The gas-liquid phase osmotic method involves a process in which an optical rod is formed by various bridgeable monomers. The distribution of the refractive index of the optical rod so made is regulated by the duration of the osmosis and the temperature at which the osmosis is brought about. The application of the optical rod so made is rather limited in view of the fact that the optical rod has a network-like framework and that the optical rod can not be changed structurally into the optical fibers. In addition, the optical rod so made is defective in design in that the polymeric accumulation is often brought about on the outer layer of the optical rod when the osmotic process of the monomers is under way. The polymeric accumulation can cause the distortion of an image transmitted by the optical rod. Moreover, the osmotic process is rather time-consuming and is therefore not cost-effective.

The ultraviolet copolymerization involves a process in which a linear complex molecule is formed from the non-bridgeable monomers in a glass tube. The formation of the complex molecule takes place progressively from the wall of the glass tube toward the central axis of the glass tube. The process is made possible by means of the ultraviolet radiation energy, which is reduced in quantity progressively from the wall of the glass tube toward the central axis of the glass tube. In other words, the distribution of the refractive index of the GI optical element so made is attained by means of the ultraviolet radiation. The ultraviolet copolymerization has a technical shortcoming in that a phase separation is prone to take place at the time when the copolymerization is in progress. As a result, the image transmitting area of the GI optical element so made is limited to the transparent central area (Rc/Rp=60–80%) of the GI optical element. This method is therefore not suitable for use in making an optical fiber having a relatively large diameter.

As disclosed in the U.S. Pat. No. 5,405,556 by the inventor of the present invention, a GI light focusing rod was produced by the swelling osmotic method in which a solid plastic rod was impregnated with a comonomer, which is then chained together with the plastic rod to form the GI light focusing rod having the greatest refractive index in the center thereof.

SUMMARY OF THE INVENTION

It is therefore the primary objective of the present invention to provide a method of making a GI plastic optical element having a large image-transmitting area.

It is another objective of the present invention to provide a novel process of making a GI optical element, which can be carried out continuously.

In keeping with the principle of the present invention, the foregoing objectives of the present invention are accomplished by a method of making a GI optical element, which comprises the steps of (a) injecting into a forming body a comonomer combination containing more than one kind of comonomers, (b) causing the forming body to swell at a constant temperature, and (c) causing the comonomer combination of the forming body to undergo a polymerization. The comonomers of the comonomer combination are different from one another in the reaction rate.

The comonomer combination may contain methyl methacrylate and benzyl methacrylate, preferably by weight ranging between 4:1 and 4:1.2.

The comonomer combination may also contain methyl methacrylate and tetrafluoropyl methacrylate, preferably by weight ranging between 4:0.6 and 4:1.

The comonomer combination may also contain methyl methacrylate and benzyl phenylacetate, preferably by weight ranging between 5:1 and 1:1.

The comonomer combination may also contain methyl methacrylate and benzyl salicylate, preferably by weight ranging between 5:1 and 1:1.

The comonomer combination may also contain methyl methacrylate and tribenzyl phosphate, preferably by weight ranging between 5:1 and 1:1.

The comonomer combination may also contain methyl methacrylate and dibromobenzene, preferably by weight ranging between 5:1 and 1:1.

The comonomer combination may also contain methyl methacrylate and bromonaphthalene, preferably by weight ranging between 5:1 and 1:1.

Preferably, the method of the present invention further comprises a photoinitiator or thermoinitiator, which is added to the comonomer combination prior to the injection of the comonomer combination into the forming body. The photoinitiator may be either benzoyl peroxide or benzoin methyl ether, preferably by weight percentage ranging between 0.1 and 3.0.

The constant temperature referred in step (b) of the method of the present invention ranges preferably between 20° C. and 80° C. The polymerization referred to in step (c) of the method of the present invention is brought about at a temperature ranging between −40° C. and 95° C., or in the presence of the ultraviolet radiation.

Preferably, the method of the present invention further comprises a post-pyrotreatment step, which is preferably brought about for a period lasting between 1 and 30 hours for eliminating the monomer which has failed to take part in the reaction. The post-pyrotreatment step is preferably carried out at a temperature ranging between −40° C. and 90° C., and along with a pressure reducing step.

The forming body of the method of the present invention is tubular in shape and is formed of an acrylic material. The swelling process of the tubular forming body is brought about causing the swelling of the wall of the tubular forming body to take place in the direction toward the center of the tubular forming body. Depending on the diameter of the tubular forming body, the swelling process may last for a period ranging between 20 minutes and 40 hours.

The method of the present invention may be carried out in its entirety in a batch or continuous manner. The GI optical element produced by the method of the present invention is a linear polymer capable of being transformed into the optical fibers having a relatively small diameter.

The foregoing objectives, features and advantages of the present invention will be more readily understood upon a thoughtful deliberation of the following detailed description of embodiments of the present invention in conjunction with the accompanying drawings.

DETAILED DESCRIPTION OF THE EMBODIMENTS

According to the present invention, the method of making a GI optical element comprises mainly the steps of (a) injecting into a forming body a comonomer combination containing more than one kind of comonomers, (b) causing the forming body to swell at a constant temperature, and (c) causing the comonomer combination of the forming body to undergo polymerization. The method of the present invention can be carried out either in a batch manner, as illustrated in the first preferred embodiment through the thirteenth preferred embodiment, or in a continuous manner as shown in the fourteenth preferred embodiment.

The following abbreviations of the comonomers, either reactive or non-reactive, are used throughout the description of the embodiments of the present invention.

MMA for methyl methacrylate;

BzMA for benzyl methacrylate;

4FMA for tetrafluoropyl methacrylate;

TPP for triphenyl phosphate;

BPAc for benzyl phenylacetate;

BSA for benzyl salicylate;

DBB for dibromobenzene;

BN for bromonaphthalene;

BPO for benzoyl peroxide;

BME for benzoin methyl ether; and

St for styrene

The first preferred embodiment comprises a mixture containing MMA/BzMA=4/1, BPO=0.3 wt %, and a preformed acrylic tube into which the mixture was injected. The acrylic tube containing therein the mixture was treated at 40° C. causing; and the wall of the acrylic tube to swell progressively toward the center of the acrylic tube for a period of 30 hours. Thereafter, a polymerization of the mixture contained in the swelled acrylic tube was brought about at 70° C. for a period lasting about 10 hours. Those monomers which had not taken part in the polymerization were eliminated in a post-polymerization process which was brought about at 70° C. and under a reduced pressure for 6 hours.

Figure 1:
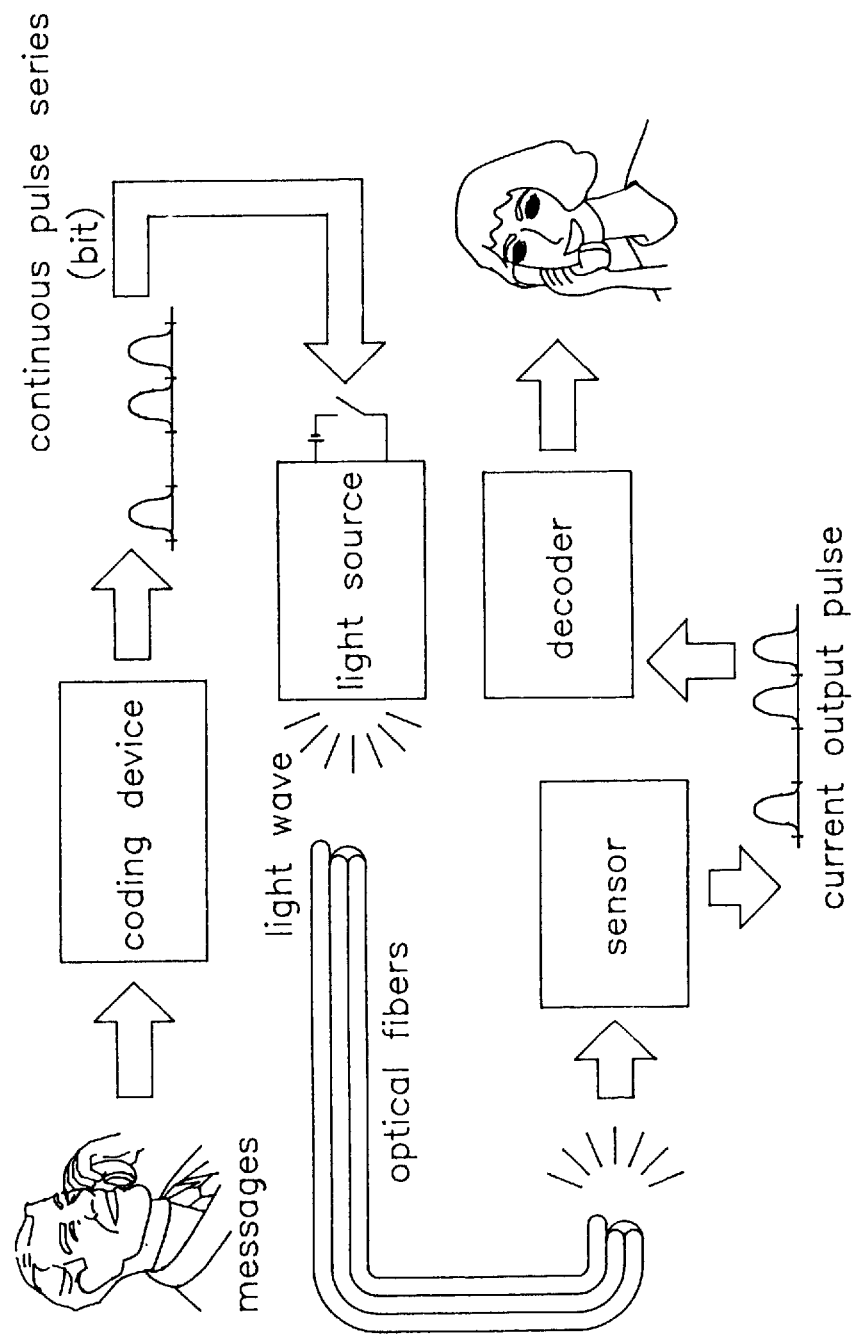
FIG. 1 is a schematic view illustrating the application of the optical fiber to an optical communication system.
Figure 2:
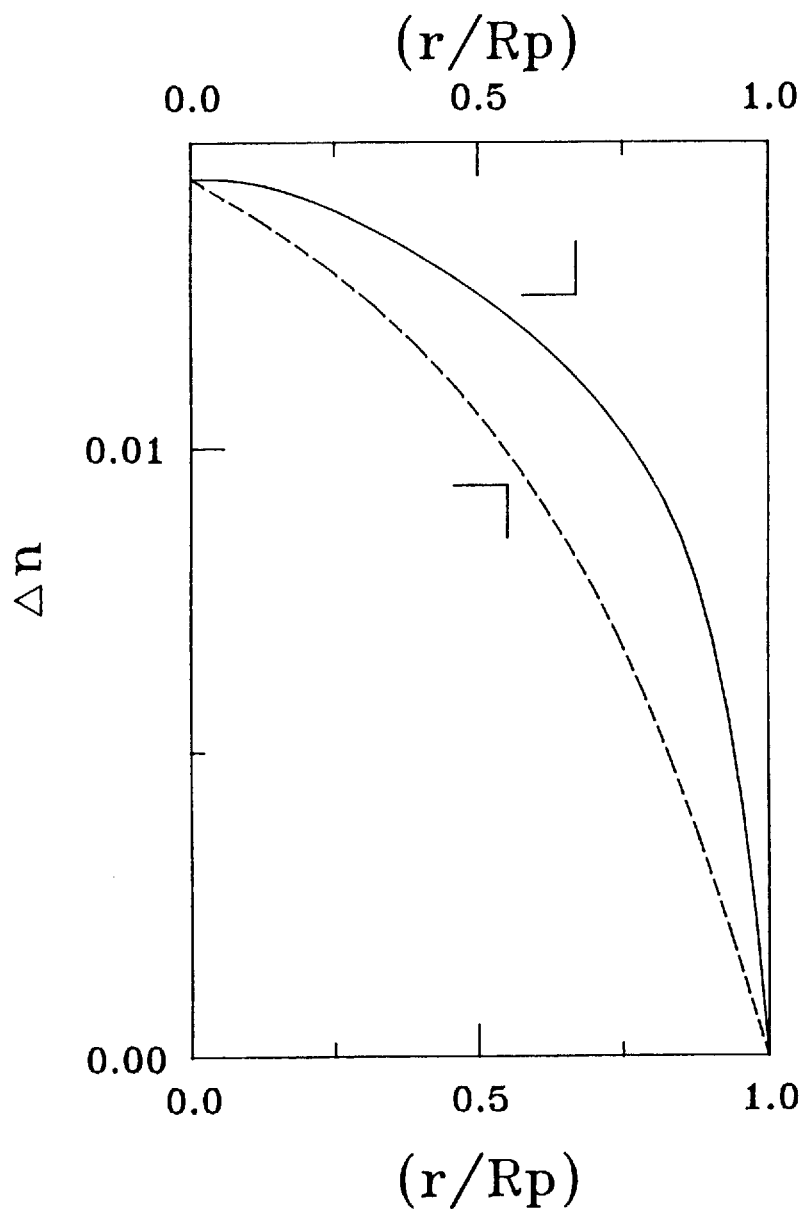
FIG. 2 is a diagram showing the refractive index distribution of the GI optical rod produced by a first preferred embodiment of the present invention.
Figure 3:
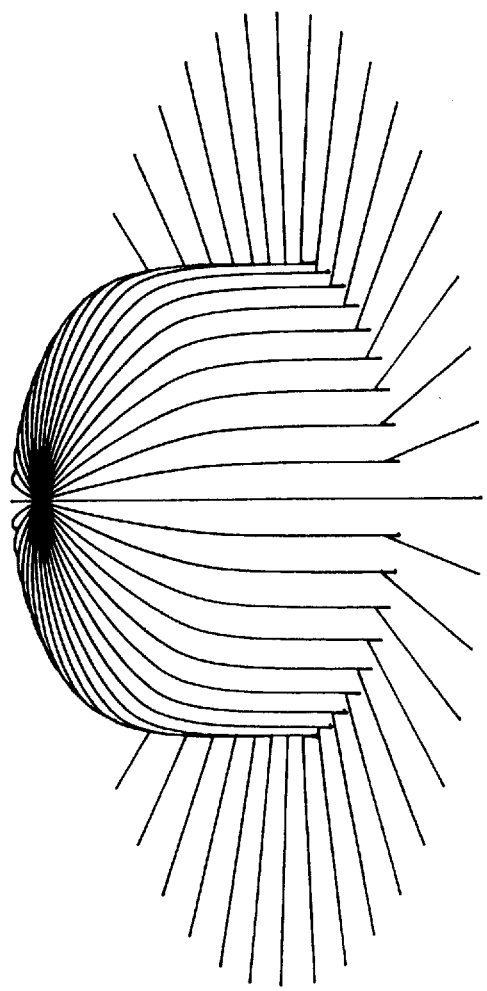
FIG. 3 is a three-dimensional diagram showing the refractive index distribution of the GI optical rod produced by the first preferred embodiment of the present invention.
Figure 4:
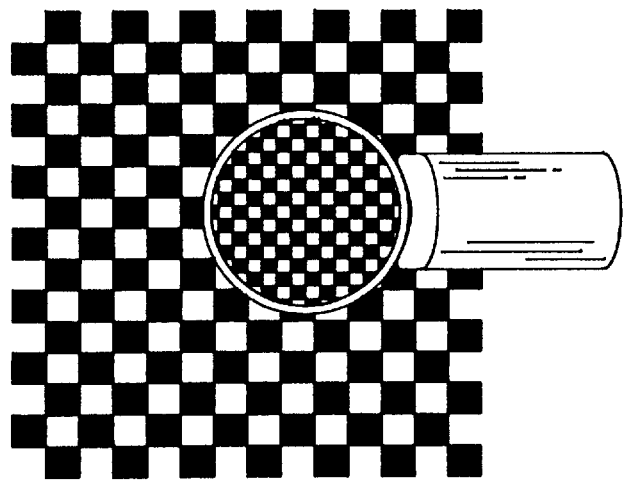
FIG. 4 shows a schematic view of images transmitted by the GI optical rod produced by the first preferred embodiment of the present invention.

The refractive index distribution, the 3-D refractive index distribution and the condition of the image transmission of the GI optical rod produced by the first preferred embodiment of the present invention are illustrated respectively in FIGS. 2, 3 and 4. In FIG. 2, Rp stands for radius of the acrylic tube; r, a distance between the center of circle of the acrylic tube and a certain point on the cross section of the acrylic tube; and Δn, the quantity of change in the refractive indexes (the difference in value between the refractive index of a point, which is separated by the distance r from the center of circle, and the refractive index of the acrylic tube wall.) FIG. 4 is a schematic view showing the transmission condition of the image which is miniaturized by a plastic optical rod having a diameter of 15 mm and a length of 164 mm.

Figure 5:
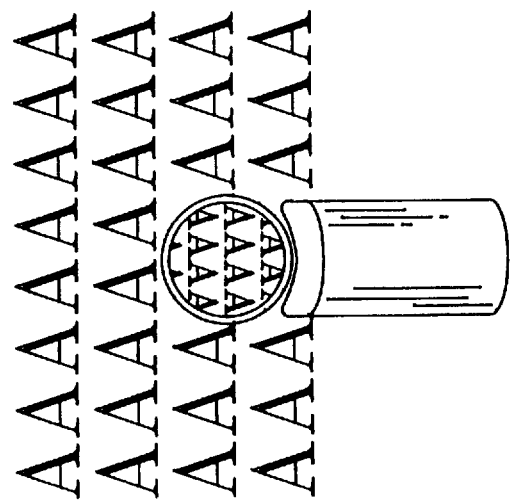
FIG. 5 shows a schematic view of images transmitted by a GI optical rod produced by a second preferred embodiment of the present invention.

In the second preferred embodiment of the present invention, a mixture consisting of MMA/BzMA=4/1.2, BPO=0.15 wt % was prepared and then injected into a preformed acrylic tube, which was subsequently treated at 30° C. causing the wall of the tube to swell progressively toward the center of the tube for 38 hours. Thereafter, a polymerization of the mixture contained in the acrylic tube was brought about at 55° C. for about 20 hours. Those monomers which have failed to take part in the polymerization were eliminated in a post-polymerization, which was carried out at 70° C. and under a reduced pressure for a period lasting 6 hours. A GI optical rod produced in the second preferred embodiment has a diameter of 15 mm and a length of 160 mm. As illustrated in FIG. 5, the images were transmitted by the GI optical rod such that the images were miniaturized and inverted.

Figure 6:
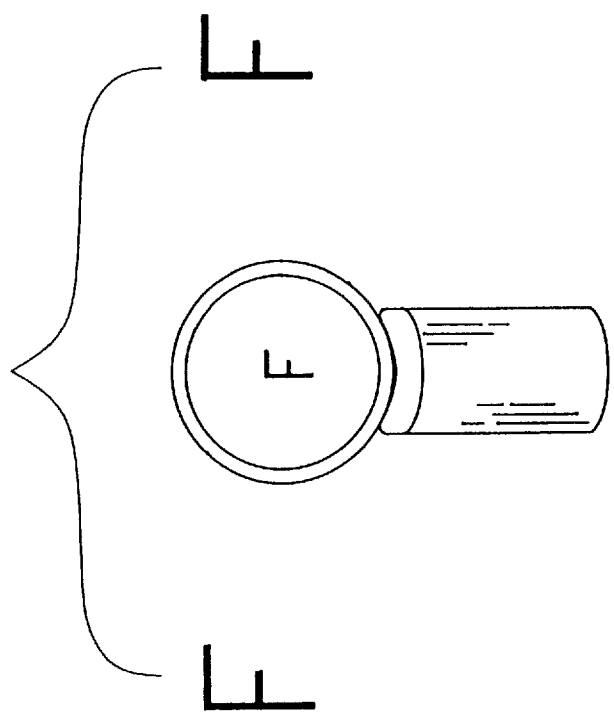
FIG. 6 shows a schematic view of images transmitted by a GI optical rod produced by a third preferred embodiment of the present invention.

In the third preferred embodiment of the present invention, a mixture consisting of MMA/4 FMA=4/1 and BPO=0.2 wt % was prepared and then injected into a preformed acrylic tube, which was subsequently treated at 50° C. for 20 hours for causing the wall of the acrylic tube to swell progressively toward the center of the tube. Thereafter, a polymerization of the mixture was brought about at 70° C. for about 10 hours. A post-polymerization was carried out at 70° C. and under a reduced pressure for 6 hours for eliminating those monomers which had failed to take part in the polymerization. A GI optical rod produced by the third preferred embodiment has a diameter of 15 mm and a length of 75 mm. As shown in FIG. 6, an image was transmitted by the GI optical rod such that the image was miniaturized and that the image was not inverted.

Figure 7:
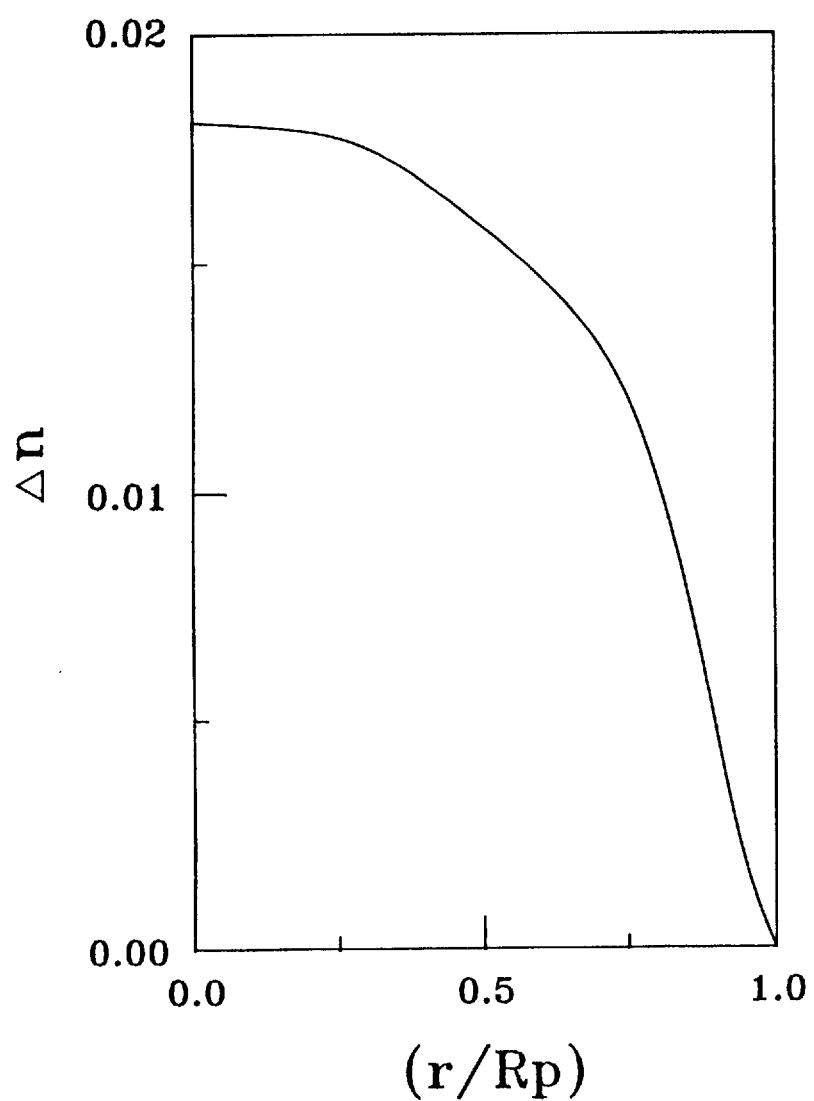
FIG. 7 is a diagram showing the refractive index distribution of a GI optical rod produced by a fourth preferred embodiment of the present invention.

The fourth preferred embodiment of the present invention was carried out by preparing first a mixture made up of MMA/4FMA=4/0.6 and BPO=0.1 wt %. The mixture was then injected into a preformed acrylic tube, which was subsequently processed at 50° C. for a 24-hour period during which the wall of the acrylic tube swelled progressively toward the center of the tube. Upon completion of the swelling process, a polymerization of the mixture was brought about at 80° C. for about 10 hours. A post-polymerization process was finally carried out at 70° C. and under a reduced pressure for eliminating the monomers which did not take part in the polymerization. The refractive index distribution of a GI optical rod produced by the fourth preferred embodiment is shown in FIG. 7.

Figure 8:
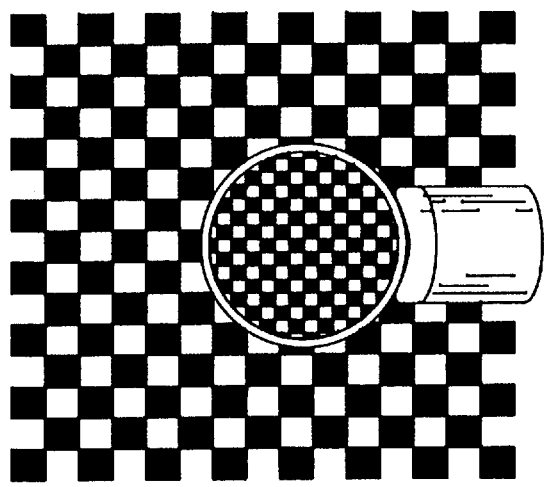
FIG. 8 shows a schematic view of images transmitted by a GI optical rod produced by a fifth preferred embodiment of the present invention.

A GI optical rod having a diameter of 15 mm and a length of 110 mm was produced by the fifth preferred embodiment of the present invention, in which a mixture containing MA/BPAc=4/1, BPO=0.2 wt % was first prepared and then injected into a preformed acrylic tube. The acrylic tube was then processed at 50° C. for 30 hours causing the wall of the tube to swell progressively toward the center of the tube. A polymerization of the mixture was subsequently brought about at 70° C. for about 20 hours. A post-polymerization process was carried out at 80° C. under reduced pressure for eliminating the monomers which had failed to respond to the polymerization. As shown in FIG. 8, the images were transmitted in a miniaturized form by the GI optical rod of the fifth preferred embodiment.

Figure 9:
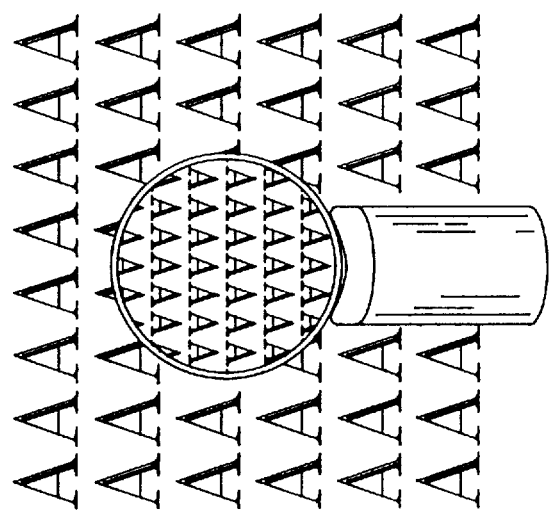
FIG. 9 shows a schematic view of images transmitted by a GI optical rod produced by a sixth preferred embodiment of the present invention.

In the sixth preferred embodiment of the present invention, a mixture consisting of MMA/BSA=4/1, BPO= 0.25 wt % was first prepared and then injected into a preformed acrylic tube, which was subsequently processed at 45° C. for 20 hours causing the wall of the tube to swell progressively toward the center of the tube. A polymerization of the mixture was then brought about at 78° C. for almost 16 hours. Upon completion of the polymerization, a post-polymerization process was brought about at 70° C. and under a reduced pressure to eliminate completely those monomers which did not participate in the polymerization. A GI optical rod so made has a diameter of 15 mm and a length of 98 mm. As shown in FIG. 9, the images were transmitted in an inverted and miniaturized form by the GI optical rod.

Figure 10:
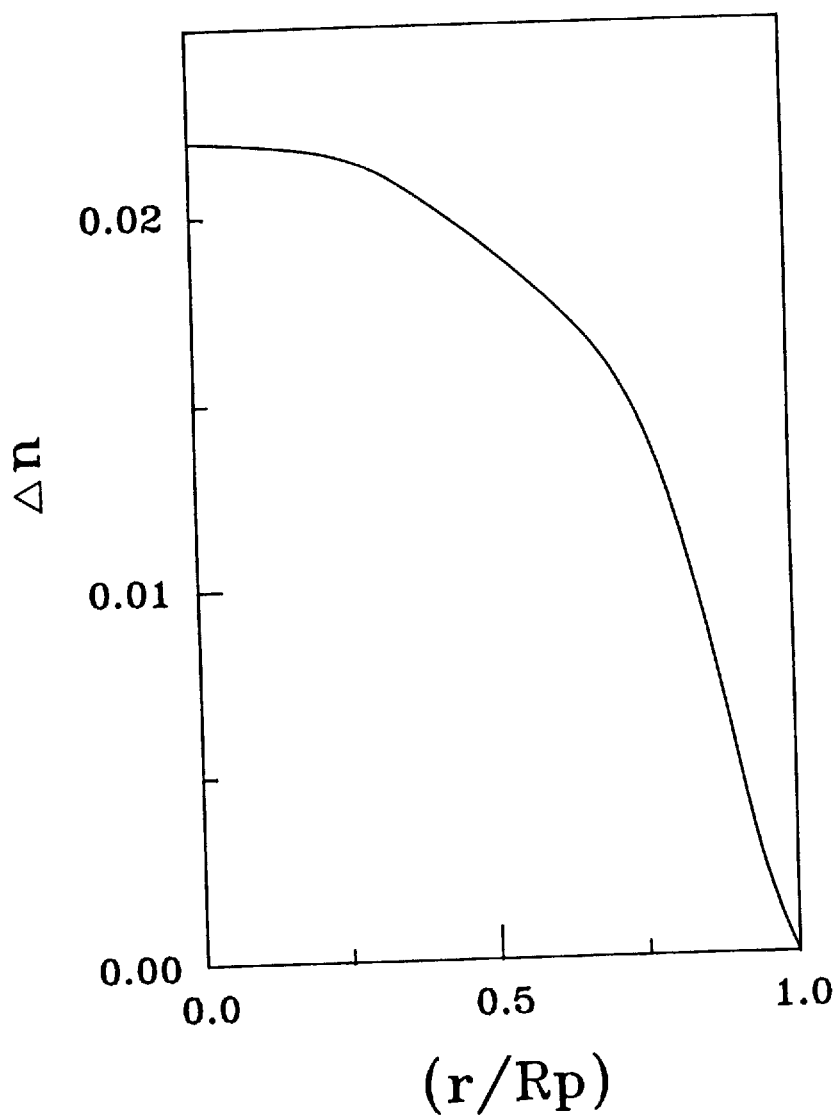
FIG. 10 is a diagram showing the refractive index distribution of a GI optical rod produced by a seventh preferred embodiment of the present invention.

The first step of the seventh preferred embodiment of the present invention was involved in the preparation of a mixture containing MMA/TPP=4/1, BPO=0.2 wt %. The mixture was then injected into a preformed acrylic tube, which was subsequently processed at 50° C. for 20 hours for causing the wall of the tube to swell progressively toward the center of the tube. A polymerization of the mixture contained in the swelled acrylic tube was brought about at 70° C. for about 30 hours. A post-polymerization process was carried out at 70° C. and under a reduced pressure for 6 hours for eliminating the monomers which did not take part in the polymerization. The refractive index distribution of a GI optical rod produced in the seventh preferred embodiment is shown in FIG. 10.

Figure 11:
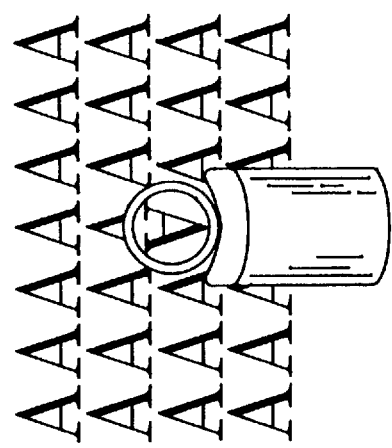
FIG. 11 shows a schematic view of images transmitted by a GI optical rod produced by an eighth preferred embodiment of the present invention.

The end product of the eighth preferred embodiment of the present invention was a GI optical rod having a diameter of 15 mm and a length of 170 mm. In the process of making the GI optical element, a mixture of MMA/DBB=5/1, BME=0.25 wt % was first prepared and then injected into a preformed acrylic tube, which was subsequently treated at 40° C. for 30 hours for causing the wall of the tube to swell progressively toward the center of the tube before a polymerization of the mixture was brought about at 70° C. for about 15 hours. Upon completion of the polymerization, a post-polymerization process was carried out at 70° C. under a reduced pressure for 10 hours for eliminating the monomers which have not participated in the polymerization. As shown in FIG. 11, an image was transmitted in an inverted form by the GI optical rod of the eighth preferred embodiment, without the image being miniaturized.

Figure 12:
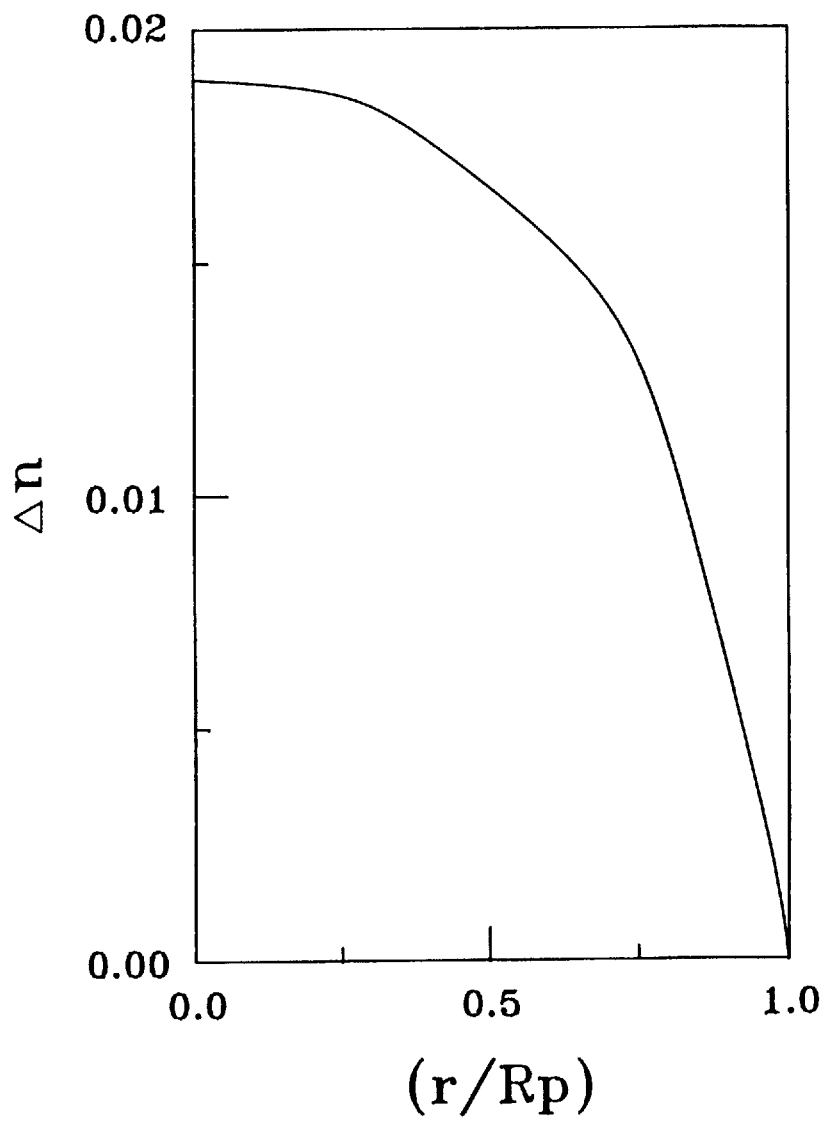
FIG. 12 is a diagram showing the refractive index distribution of a GI optical rod produced by a ninth preferred embodiment of the present invention.
Figure 13:
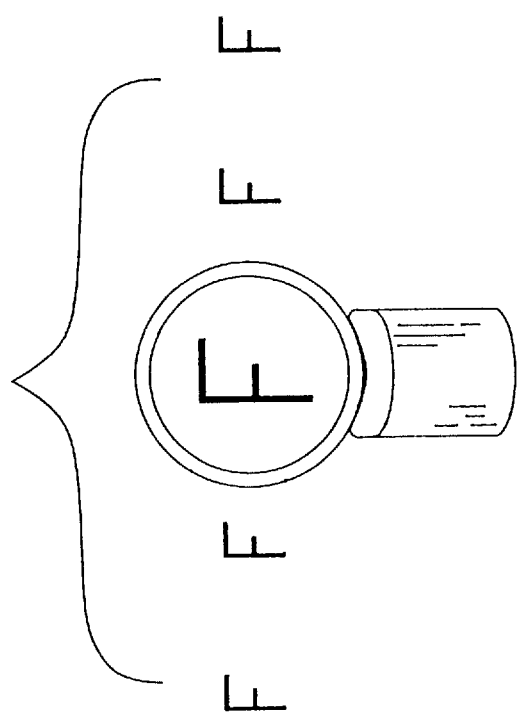
FIG. 13 shows a schematic view of images transmitted by the GI optical rod produced by the ninth preferred embodiment of the present invention.

In the ninth preferred embodiment of the present invention, a mixture of MMA/BN=4/1, BPO=0.2 wt % was prepared and then injected into a preformed acrylic tube, which was subsequently processed at 50° C. for 20 hours causing the wall of the acrylic tube to swell gradually toward the center of the tube. A polymerization of the mixture contained in the swelled tube was brought about at 70° C. for about 36 hours. A post-polymerization process was undertaken at 70° C. a under a reduced pressure for 6 hours for eliminating completely the monomers which were not polymerized. A GI optical rod having a diameter of 15 mm and a length of 120 mm was produced by the ninth preferred embodiment. The refractive index distribution of the GI optical rod is shown in FIG. 12. As shown in FIG. 13, an image was amplified and transmitted by the GI optical rod, without the image being turned upside down.

Figure 14:
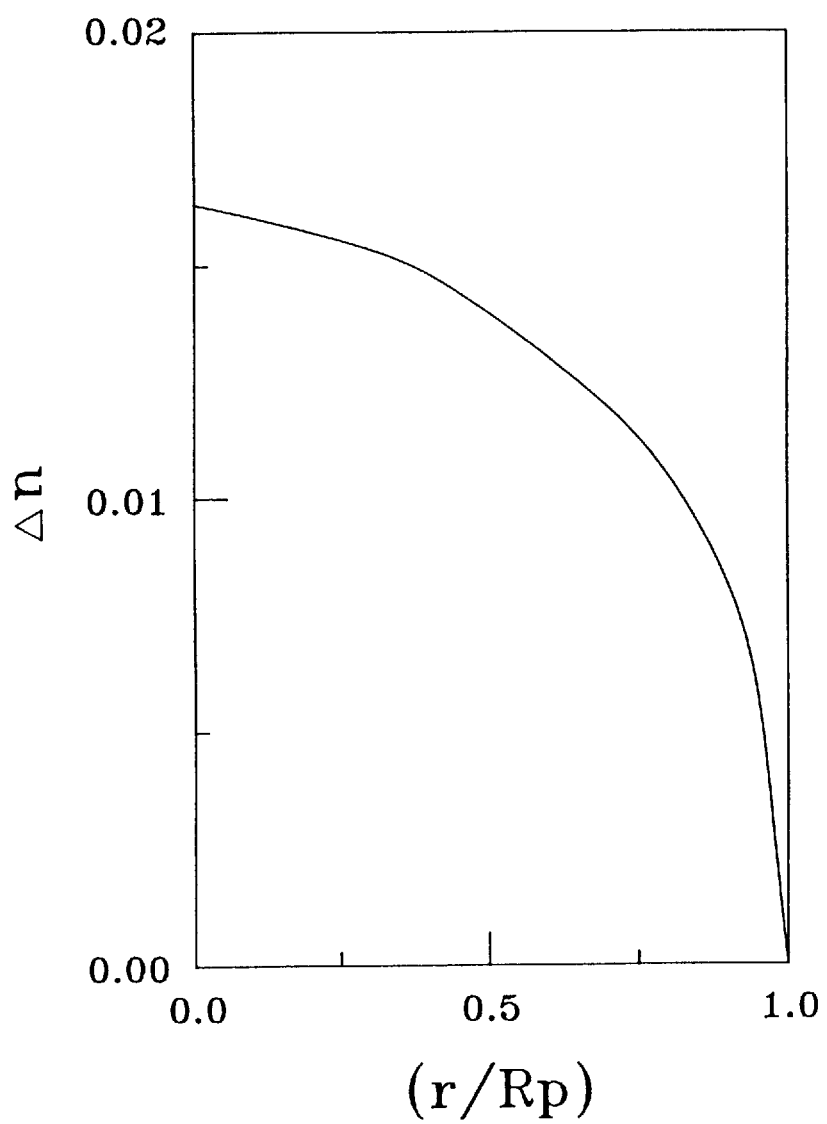
FIG. 14 is a diagram showing the refractive index distribution of a GI optical rod produced by a tenth preferred embodiment of the present invention.
Figure 15:
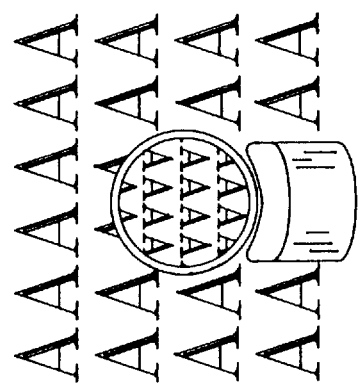
FIG. 15 shows a schematic view of images transmitted by the GI optical rod produced by the tenth preferred embodiment of the present invention.

The tenth preferred embodiment of the present invention was involved first in the preparation of a mixture consisting of MMA/4FMA=4/1, BPO=0.2 wt %. The mixture was then injected into a preformed acrylic tube, which was then subjected to a swelling process at 25° C. for 40 hours. In the swelling process, the wall of the acrylic tube swells progressively toward the center of the acrylic tube. Upon completion of the swelling process, the mixture contained in the acrylic tube was subjected to a polymerization at 45° C. for about 40 hours. Thereafter, a post-polymerization process was brought about at 80° C. under reduced pressure for 6 hours for eliminating those monomers which were not polymerized. A GI optical rod having a diameter of 15 mm and a length of 183 mm was produced in the tenth preferred embodiment of the present invention. The refractive index profile of the GI optical rod of the tenth preferred embodiment is shown in FIG. 14. As shown in FIG. 15, the images were transmitted by the GI optical rod of the tenth preferred embodiment such that the images were miniaturized and inverted.

Figure 16:
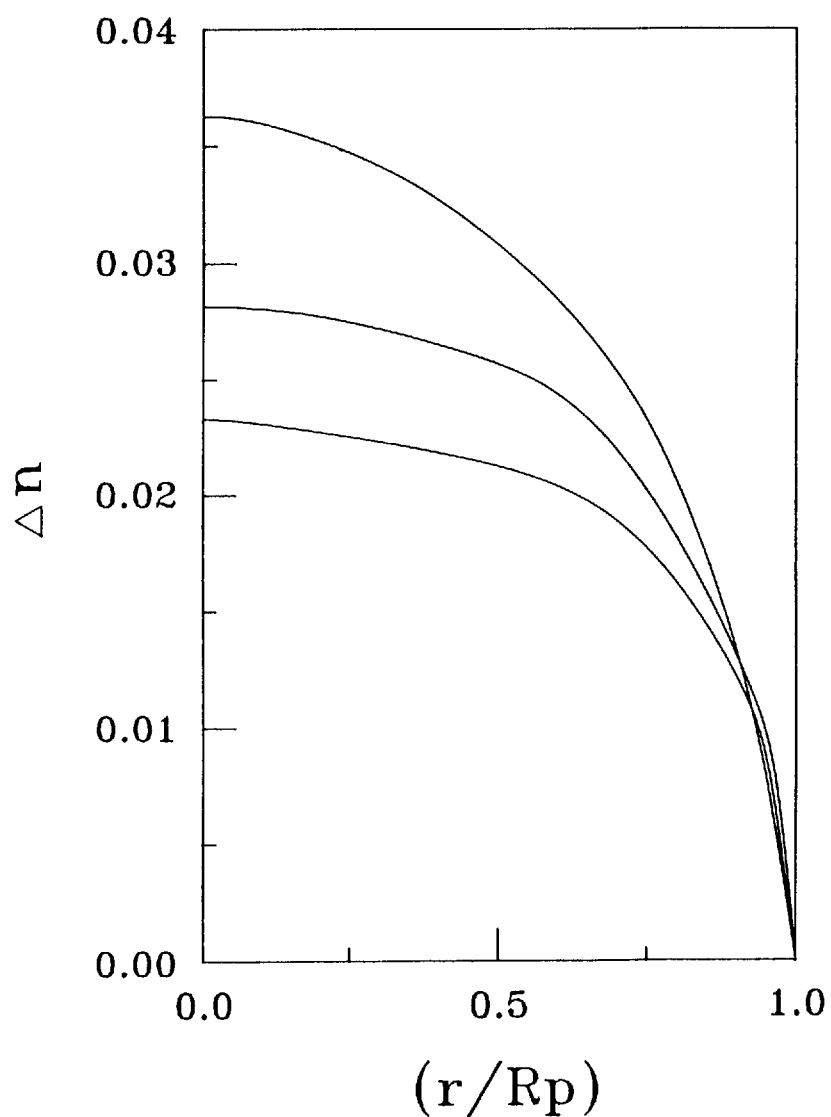
FIG. 16 is a diagram showing comparatively the refractive index distributions of the GI optical rods produced respectively by an eleventh preferred embodiment, a twelfth preferred embodiment and a thirteenth preferred embodiment of the present invention.

In addition to the constituents of the comonomer mixture, the variations in the process temperature and the process duration result in the deviations in the refractive index profile (distribution) of the GI optical rods, as exemplified by the preferred embodiments 11-3 of the present invention. The results of the preferred embodiments 11-13 are presented in the following table in conjunction with FIG. 16.

| monomer mixture (weight ratio) | swelling temperature (swelling duration) | polymerization temperature (polymerization duration) | results (FIG. 16) |
|---|---|---|---|
| MMA/DBB = 4/1.4 | 28° C. (30 hr) | 47° C. (35 hr) | 曲線 A |
| MMA/BzMA/St = 4/1/0.1 | 47° C. (20 hr) | 65° C. (25 hr) | 曲線 B |
| MMA/BN = 5/1 | 35° C. (30 hr) | 80° C. (18 hr) | 曲線 C |

Figure 17:
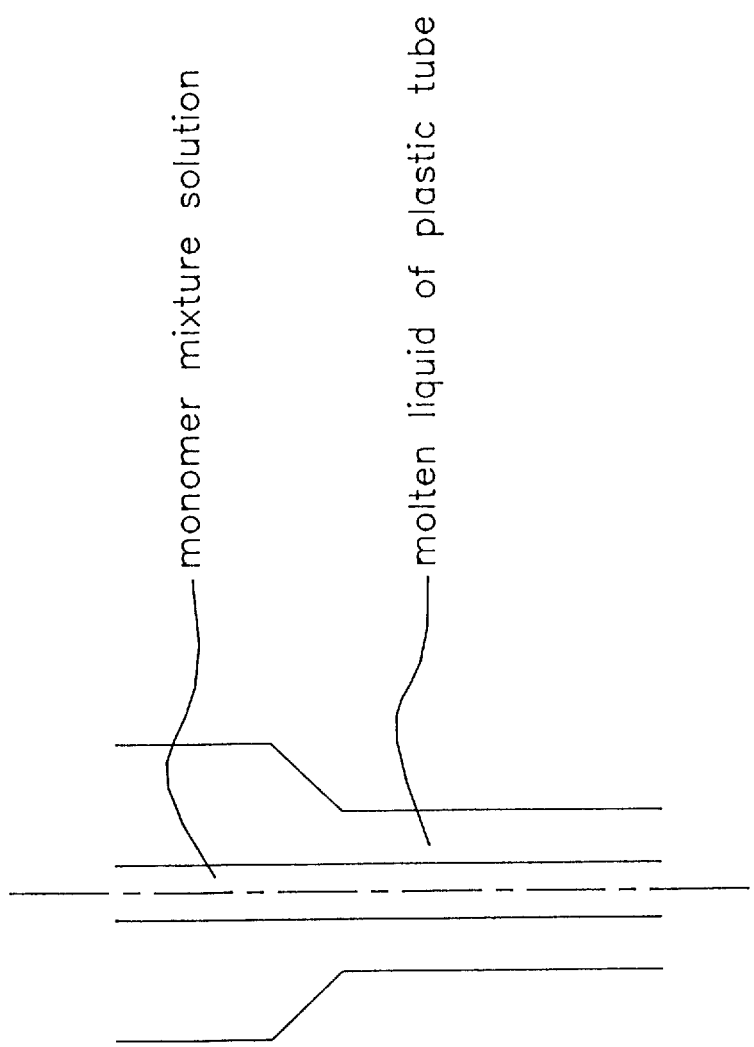
FIG. 17 shows a longitudinal sectional view of a plastic tube in an extrusion process of the continuous operation of the present invention.
Figure 18:
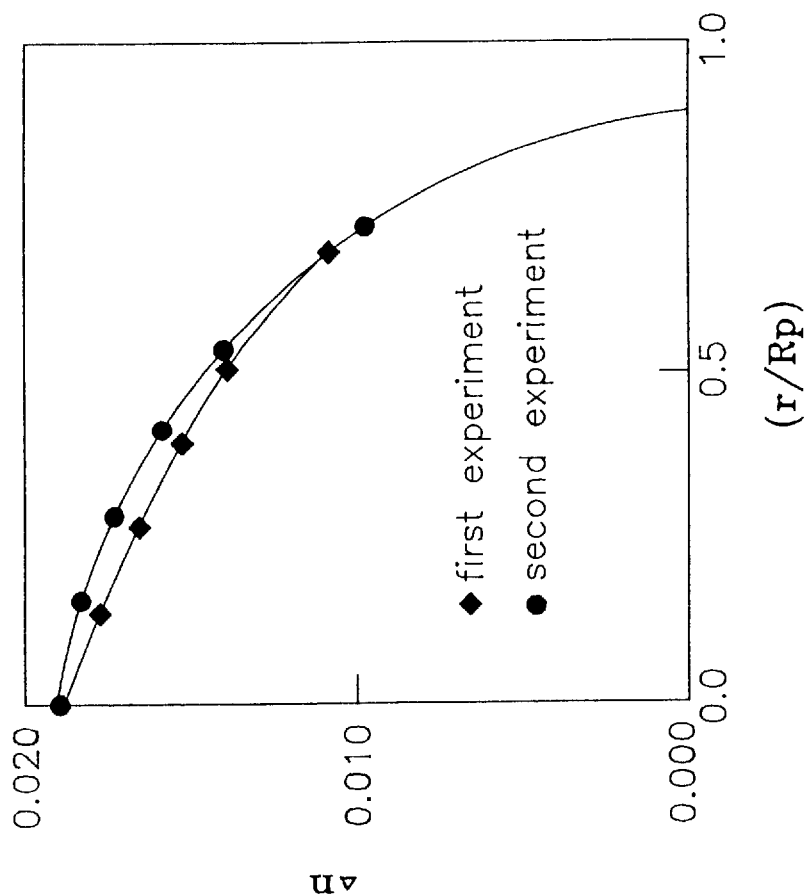
FIG. 18 is a diagram showing comparatively the refractive index distributions of two GI optical rods produced by a fourteenth preferred embodiment of the present invention.

In the fourteenth preferred embodiment of the present invention, a monomer mixture containing MMA/TPP=4/1, BPO=0.18 wt % was prepared and then injected into the center of a preformed plastic tube having a diameter of 1.5 mm, the tube being verified as shown in FIG. 17. The plastic tube was made from a PMMA (polymethyl methacrylate) plastic material by concentric extrusion molding. A swelling process of the plastic tube was carried out at a constant temperature of 50° C. Upon completion of the swelling process, a polymerization of the mixture was brought about in the presence of ultraviolet radiation. As shown in FIG. 18, two GI optical fibers of the fourteenth preferred embodiment were produced by two experiments in which the identical methods were employed. The refractive index distributions of these two GI optical fibers reveal the fact that the refractive index distributions of the optical fibers are repetitious, and that the optical fibers in question are capable of an image transmission.

The GRIN rods are used in the image transmission of a facsimile, a compact photocopier, etc. In addition, the GRIN rods are indispensable to the production of sensors, optical fiber connection devices, laser disc reading heads, light-focusing lenses, etc. Moreover, the GRIN rods will continue to play an important role in the production of the state-of-the-art integrated optical elements.

What is claimed is:

1. A method of making a gradient index optical element, comprising the steps of:
   (a) preparing a comonomer combination;
   (b) injecting said comonomer combination into a vertical tubular preformed forming body;
   (c) processing said forming body at a constant temperature such that said forming body swells; and (d) polymerizing said comonomer combination contained in said forming body.

2. The method as defined in claim 1 wherein said comonomer combination consists of two or more different comonomers that are divergently responsive to polymerization.

3. The method as defined in claim 2, wherein said comonomers of said comonomer combination are methyl methacrylate and benzyl methacrylate.

4. The method as defined in claim 3, wherein said methyl methacrylate and said benzyl methacrylate are combined by a weight ratio ranging between 4:1 and 1:1.

5. The method as defined in claim 2, wherein said comonomers of said comonomer combination are methyl methacrylate and tetrafluoropyl methacrylate.

6. The method as defined in claim 5, wherein said methyl methacrylate and said tetrafluoropyl methacrylate are combined by a weight ratio ranging between 4:0.6 and 1:1.

7. The method as defined in claim 2, wherein said comonomers of said comonomer combination are methyl methacrylate and benzyl phenylacetate.

8. The method as defined in claim 7, wherein said methyl methacrylate and said benzyl phenylacetate are combined by a weight ratio of 4:1.

9. The method as defined in claim 2, wherein said comonomers of said comonomer combination are methyl methacrylate and benzyl salicylate.

10. The method as defined in claim 9, wherein said methyl methacrylate and said benzyl salicylate are combined by a weight ratio of 4:1.

11. The method as defined in claim 2, wherein said comonomers of said comonomer combination are methyl methacrylate and tribenzyl phosphate.

12. The method as defined in claim 11, wherein said methyl methacrylate and said tribenzyl phosphate are combined by a weight ratio of 4:1.

13. The method as defined in claim 2, wherein said comonomers of said comonomer combination are methyl methacrylate and dibromobenzene.

14. The method as defined in claim 13, wherein said methyl methacrylate and said dibromobenzene are combined by a weight ratio of 4:1.

15. The method as defined in claim 2, wherein said comonomers of said comonomer combination are methyl methacrylate and bromonaphthalene.

16. The method as defined in claim 15, wherein said methyl methacrylate and said bromonaphthalene are combined by a weight ratio of 4:1.

17. The method as defined in claim 1 further comprising the step of adding said comonomer combination into a photoinitiator or thermoinitiator before said comonomer combination is injected into said forming body.

18. The method as defined in claim 17, wherein said photoinitiator is benzoyl peroxide or benzoin methyl ether.

19. The method as defined in claim 17, wherein said comonomer combination contains 0.1–3.0% by weight of said photoinitiator.

20. The method as defined in claim 1, wherein said constant temperature ranges between 20° C. and 50° C.

21. The method as defined in claim 1, wherein said comonomer combination contained in said forming body is polymerized at a temperature ranging between −40° C. and 80° C.

22. The method as defined in claim 1, wherein said comonomer combination contained in said forming body is polymerized in the presence of ultraviolet radiation.

23. The method as defined in claim 1, wherein said comonomer combination contained in said forming body is polymerized for a period between 10 hours and 40 hours.

24. The method as defined in claim 1 further comprising the step of post-pyrotreatment processing for eliminating non-polymerized comonomer contained in said comonomer combination.

25. The method as defined in claim 24 wherein said post-pyrotreatment processing occurs at a temperature ranging between −70° C. and 80° C.

26. The method as defined in claim 25 wherein said post-pyrotreatment processing occurs at said temperature and under a reduced pressure.

27. The method as defined in claim 26 wherein said post-pyrotreatment processing occurs at said temperature and under said reduced pressure for a period between 6 hours and 10 hours.

28. The method as defined in claim 1 wherein said forming body is an acrylic tube having a wall that swells toward a center of said acrylic tube.

29. The method as defined in claim 28 wherein said wall of said acrylic tube swells for a duration between 20 hours and 40 hours.

30. The method as defined in claim 28 wherein said gradient index optical element has a refractive index distribution progressively lower toward said wall from said center.

31. The method as defined in claim 1 wherein said steps (b), (c) and (d) occur in a continuous manner.

* * * * *

UNITED STATES PATENT AND TRADEMARK OFFICE
CERTIFICATE OF CORRECTION

PATENT NO. : 5,846,456
DATED : December 8, 1998
INVENTOR(S) : Jui Hsiang Liu

It is certified that error appears in the above-identified patent and that said Letters Patent is hereby corrected as shown below:

Column 3, line 65, after "referred" insert -- to --.
Column 5, line 56, replace "causing; and" with -- causing --.
Column 6, line 8, replace "wall.)" with -- wall). --.
Column 6, line 32, after "20 hours" delete "for".
Column 7, line 39, after "30 hours" delete "for".
Column 7, line 57, before and after "under" delete "a".
Column 8, line 22, change "11-3" to -- 11-13 --.
Column 8, line 39, after "mm," delete "the tube being verified".
Column 9, line 29, replace "of4:1" with -- of 4:1 --.

Signed and Sealed this

Twentieth Day of March, 2001

Attest:

NICHOLAS P. GODICI

Attesting Officer    Acting Director of the United States Patent and Trademark Office